(12) United States Patent
Lee

(10) Patent No.: US 10,103,536 B2
(45) Date of Patent: Oct. 16, 2018

(54) CIRCUIT FOR DETECTING ARC DUE TO CONTACT INFERIORITY

(71) Applicant: SeungChul Lee, Daejeon (KR)

(72) Inventor: SeungChul Lee, Daejeon (KR)

( * ) Notice: Subject to any disclaimer, the term of this patent is extended or adjusted under 35 U.S.C. 154(b) by 310 days.

(21) Appl. No.: 15/151,835

(22) Filed: May 11, 2016

(65) Prior Publication Data

US 2017/0331273 A1    Nov. 16, 2017

(51) Int. Cl.
*H02H 3/00*    (2006.01)
*H02H 3/16*    (2006.01)
*H02H 1/00*    (2006.01)
*G08B 21/18*   (2006.01)

(52) U.S. Cl.
CPC .......... *H02H 3/162* (2013.01); *H02H 1/0015* (2013.01); *G08B 21/185* (2013.01)

(58) Field of Classification Search
CPC ...................................................... H02H 3/162
See application file for complete search history.

(56) References Cited

U.S. PATENT DOCUMENTS

| 4,769,737 A * | 9/1988 | Ogita ...................... H01H 9/56 |
| | | 307/137 |
| 6,259,059 B1* | 7/2001 | Hsu ...................... B23K 9/0735 |
| | | 219/130.31 |
| 9,722,408 B2* | 8/2017 | Curtis .................... H02H 3/162 |

FOREIGN PATENT DOCUMENTS

| KR | 10-0914999 B1 | 9/2009 |
| KR | 10-2013-0095947 A | 8/2013 |

* cited by examiner

*Primary Examiner* — Stephen W Jackson
(74) *Attorney, Agent, or Firm* — Rabin & Berdo, P.C.

(57) ABSTRACT

A circuit for detecting arc due to a bad contact includes a rectifying unit for rectifying an arc pulse voltage due to the bad contact, an arc voltage detection unit for detecting an arc voltage through the rectifying unit, a high-frequency pass filter combined in a front end or a rear end of the arc voltage detection unit, a control signal generation unit for generating a relay driving control signal using the arc voltage detected by the arc voltage detection unit, and a relay unit controlled by the relay driving control signal and electrically connecting a ground line and a power line of the interior wiring.

8 Claims, 3 Drawing Sheets

CIRCUIT FOR DETECTING ARC DUE TO CONTACT INFERIORITY

BACKGROUND OF THE PRESENT INVENTION

1. Field of the Present Invention

The present invention relates to a circuit for detecting arcs due to bad contact, and more specifically, to a circuit for issuing a warning by detecting arcs or sparks due to bad contact in the electric circuit, or for generating a leakage current path to operate an earth leakage breaker.

2. Description of the Related Art

About 30% of the whole fires are an electric fire and 60% or more thereof are generated due to an abnormality of a wiring system. Also, most fires due to the abnormality of the wiring system are an overheat accident due to poor contact and tracking/arc accidents due to the bad insulation between lines.

Generally, there is a problem in that it is impossible to perform a preventive maintenance in these accidents of the wiring system. Especially, since the bad insulation due to pollution or carbonization of the insulating material is a kind of load current, it cannot be blocked by a conventional circuit breaker and it is unreal to check out the bad insulation through the insulation measuring instrument.

In case of this line bad insulation, in other words, the interline leak, it is not seen by the naked eye in the bright place because of the arc discharge of the minute current. Also, the arc discharge like the minute thread is continued in only the dark place. Moreover, if the insulator is carbonized by the arc heat, the non-conductor is changed into the conductor.

Also, by the characteristic of the arc discharge, since the discharge is made along the path capable of keeping the current flowing well, it is called as a tracking arc. During a thunderbolt, the shape of the thunderbolt is similar to the meandering shape like a branch shape. In case of the initial tracking arc, since the arc current is so small, it cannot be detected by the general ARC detection technology. Moreover, in the general arc circuit breaker, the arc current and the normal load current are distinguished based on the shape of the current waveform flowing to the load side, the amount of the distorted current generated during the discharge thereof, and the rising and falling angles of the voltage. However, it is impossible to detect the tracking arc, which is a minute current, because it cannot be distinguished from the noise included in the electric power in case of the small arc current.

In the authentication rules of the conventional arc circuit breaker or the arc alarm, it is authenticated based on the load current 5 Ampere. However, since 5 Ampere is a large current value, it corresponds to a state in that the carbonization of the insulator due to the bad contact is in an advanced stage. Accordingly, it cannot correspond to the current value capable of preventing the electric fire.

An arc detecting type circuit breaker for low voltage indoor electric line disclosed in Korean registered patent KR0914999B includes a current transformer for maintaining a linear characteristic in a low frequency domain and a high frequency domain, preventing the damage including a fire duet to the parallel arc current, detecting the sequential high current by the parallel arc, and detecting the parallel arc current using the detection parameter; an integrating unit for integrating the signal detected by the current sensor; a filter unit for removing a high frequency noise from the signal integrated by the integrating unit and restricting the current; a rectifying unit for full-wave rectifying the signal passing through the filter unit; an amplifying unit for amplifying the signal rectified by the rectifying unit; a converting unit for converting the current amplified by the amplifying unit; a SCR (Silicon Controlled Rectifier) for receiving the voltage converted by the converting unit to be conducted and directly applying a current signal to a gate thereof; and a trip coil connected to the anode of the SCR and operating the circuit breaker for blocking the circuit.

An arc detection apparatus for low voltage indoor electric line disclosed in Korean published patent KR2013-0095947A includes a CT installed between an exterior voltage input line and a load; an arc detector for detecting a current by an arc fault from the CT; a voltage phase detection unit for detecting a phase of voltage presently inputted by the power line; and a microprocessor for comparing the detected voltage phase with the current so as to determine as arc characteristics if the arc is generated in the current within the voltage phase of the arc recognition section and determine as load characteristics, if the arc is generated in the current within the voltage phase of another section.

However, in the apparatus of detecting the arc through the detection of the current, the magnetic saturation phenomenon is generated in the core of the current transformer core due to the load current flowing through the current transformer because of using the current transformer. Accordingly, it is difficult to measure the normal current because the inductance value is changed according to the size of the load.

SUMMARY OF THE PRESENT INVENTION

The object of the present invention, which has been developed according to the aforementioned necessity, is to provide a circuit for detecting arc due to bad contact.

According to a first aspect of the present invention to achieve the object described above, there is provided a circuit for detecting arc due to bad contact generated between lines and arranged in a post part of a ground leakage breaker of an interior wiring, including: a rectifying unit for operating power having an arc pulse current due to the bad contact; an arc voltage detection unit for detecting an arc voltage due to the arc pulse current passing through the rectifying unit; a high-frequency pass filter combined in a front end or a post part of the arc voltage detection unit; a control signal generation unit for generating a relay driving control signal using the arc voltage detected by the arc voltage detection unit; and a relay unit controlled by the relay driving control signal and electrically connecting a ground line and a power line of the interior wiring, wherein the control signal generation unit includes: a pulse signal generation unit for receiving the arc voltage through an input terminal and generating a pulse signal having a predetermined pulse width; a pulse delay signal generation unit for generating a pulse delay signal, when the pulse signal outputted from the pulse signal generation unit is higher than or equal to a predetermined number; and a driving control signal generation unit for generating a relay driving control signal so as to operate the relay unit by using the pulse delay signal.

According to a second aspect of the present invention to achieve the object described above, there is provided a circuit for detecting arc due to bad contact generated between lines and arranged in a post part of a ground leakage breaker of an interior wiring, including: a rectifying unit for rectifying an AC voltage of the interline; a pulse signal combining unit for recognizing a distributed capacity existed between the circuit for detecting arc including a power source and the ground as an arc voltage of high frequency during arc generation due to the bad contact; a signal amplification unit switched to the arc voltage of high frequency applied through the pulse signal combining unit and amplifying the arc pulse voltage; a high-frequency pass filter combined in a front end or a post part of the signal amplification unit; a control signal generation unit for generating a relay driving control signal using the arc voltage outputted from the signal amplification unit; and a relay unit controlled by the relay driving control signal and electrically connecting a ground line and a power line of the interior wiring.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, detailed embodiments for implementing the present invention will be explained with referenced to the drawings.

Figure 1:
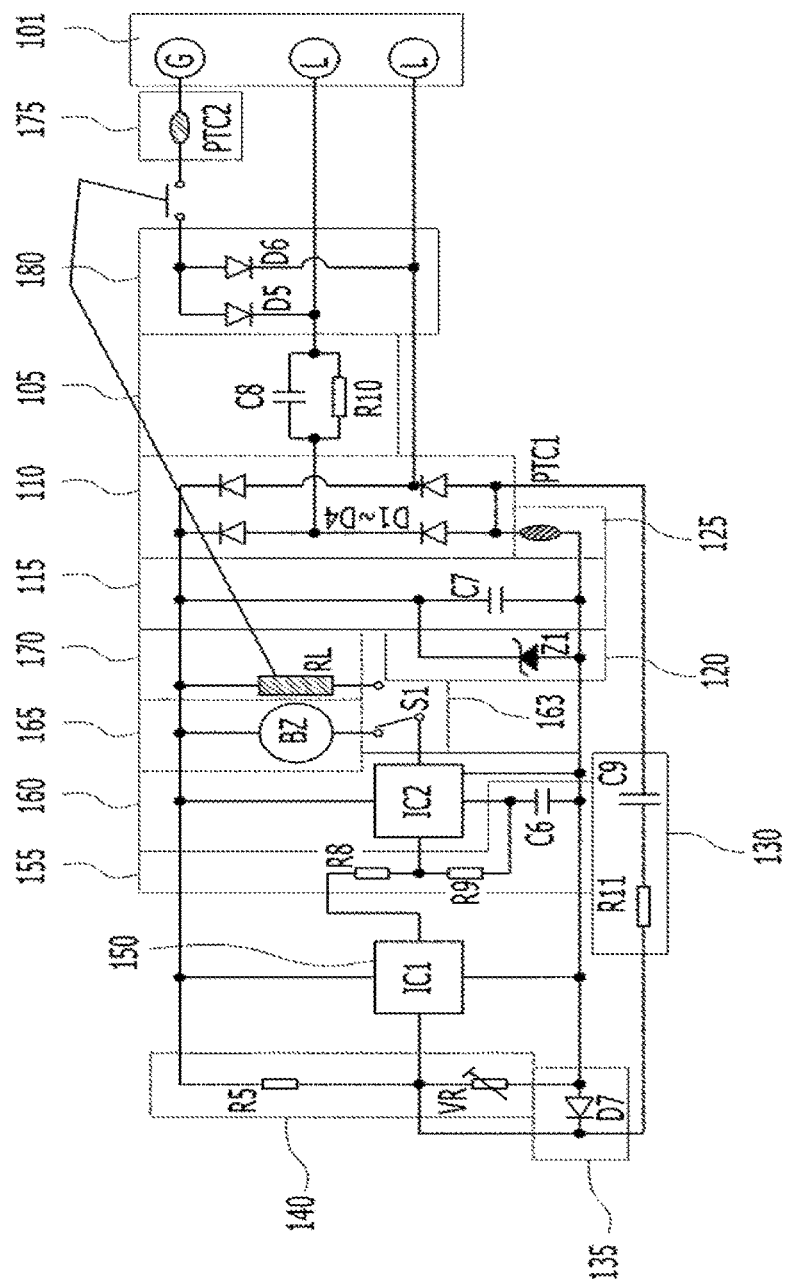
FIG. 1 is a whole circuit diagram illustrating a circuit for detecting arc due to bad contact according to a first embodiment of the present invention.

FIG. 1 is a whole circuit diagram illustrating a circuit for detecting arc due to bad contact according to a first embodiment of the present invention.

The circuit for detecting arc due to bad contact according to the first embodiment of the present invention includes an interior wire coupling unit 101, a high-frequency pass filter 105, a rectifying unit 110, a smoothing unit 115, a constant voltage unit 120, an arc voltage detection unit 125, a pulse signal combining unit 130, a unidirectional current passing unit 135, a sensitivity adjusting unit 140, a pulse signal generation unit 150, a pulse signal delay unit 155, a driving control signal generation unit 160, a driving control switch 163, an alarming unit 165, a relay unit 170, a leakage current restriction unit 175, and a leakage current path generation unit 180.

In the first embodiment of the present invention, the alarming unit 165 is operated by using a high frequency impulse type arc voltage applied to the arc voltage detection unit 125, it send the alarm or the relay unit 170 is operated so as to pass the leakage current, thereby driving the ground leakage breaker installed in a indoor lead-in part.

The interior wire coupling unit 101 is combined with the interior wiring. For example, it can be combined to the removable socket outlet in the form of a plug. Moreover, according to the other embodiment of the present invention, it can be fixedly combined with the interior wiring. In the meantime, since the bad contact can be generated between all wires connected electrically in a post part of the ground leakage breaker of the interior wiring, the insulated coating is carbonized to be generated. Also, since the insulated coating is peeled off by using the wire for a long time, it can be generated owing to the insulation failure. According to the other example, where the plug is loosely combined with the socket outlet in the post part of the ground leakage breaker of the interior wiring, the bad contact can be generated.

In the interior wire coupling unit 201, the "L" means a power line and the "G" means a ground line. Any one of the two power lines is connected to the ground.

The high-frequency pass filter 105 includes a resistor R10 and the capacitor C8 connected with each other in parallel. The capacitor C8 passes a pulse current inputted through the alternating current power connection terminal L and blocks a direct current. The resistor R10 discharges the electric charge charged in the capacitor C8.

The rectifying unit 110 is connected to the output side of the high-frequency pass filter 105 and rectifies the arc voltage outputted from the high-frequency pass filter 105. According to a preferred embodiment of the present invention, the rectifying unit 110 is a bridge diode form. However, if it is the configuration of rectifying the AC power source, it is not limited to the kind thereof.

The smoothing unit 115 includes a capacitor C7 connected to both ends of the rectifying unit 110 in parallel. The capacitor C7 serves to smooth the voltage outputted from the rectifying unit 110.

The constant voltage unit 120 includes a Zener diode Z1 connected to the smoothing unit 115 in parallel and maintains the output voltage of the rectifying unit 110 within the fixed range.

The arc voltage detection unit 125 may be a positive temperature coefficient device (PTC1) for creating the arc voltage by the arc pulse current, which passes through the smoothing unit 115.

The pulse signal combining unit 130 includes a resistor R11 and a capacitor C9 serially connected to the output side of the arc voltage detection unit 125 and passes the arc pulse current of the high frequency component which passes through the arc voltage detection unit 125.

The unidirectional current passing unit 135 is connected between the output side of the pulse signal combining unit 130 and the other end of capacitor C7 inside the arc voltage maintaining unit 115 and prevents the arc pulse current passing through the pulse signal combining unit 130 from being passed toward the smoothing unit 115.

The pulse signal generation unit 150 receives the arc voltage of the high frequency component applied to the arc voltage detection unit 125 through an input terminal and generates the pulse signal having the predetermined pulse width. Here, according to a preferred embodiment of the present invention, the pulse signal generation unit 150 may be the mono-stable multi-vibrator. Also, the sensitivity adjusting unit 140 connected to the input side of the pulse signal generation unit 150 includes a variable resistor, so that it controls the arc pulse reference value capable of recognizing the arc voltage as the arc pulse. Accordingly, it detects up to the arc pulse current of 5 mA. In the meantime, although it is not illustrated, the oscillation time constant of the pulse signal generation unit 150 can be varied according to the amount of the capacitance and the resistance connected to the control stage of the interior switching device.

The pulse delay signal generation unit 155 generates a pulse delay signal, when the pulse signal outputted from the pulse signal generation unit 150 is higher than or equal to a predetermined number or it is repeated over the fixed length. That is, where the pulse signal is higher than or equal to a predetermined number or it is repeated over the fixed length, the capacitor C6 is charged and the pulse delay signal is generated.

If the driving control signal generation unit 160 generates a driving control signal to operate an alarm buzzer 165 using the pulse delay signal, driving control switches S1 and 163 are operated, so that the alarm buzzer 165 is operated or the relay coil of the relay unit 170 is operated. According to another embodiment of the present invention, the multiple switches are disposed so that the buzzer 165 and the relay unit 170 can be operated at the same time. If the relay unit 170 is operated and the leakage current flows, the ground leakage breaker (not shown) equipped in the inside of the house distribution panel is operated. According to a preferred embodiment of the present invention, the driving control signal generation unit 160 can be implemented by a non-stable multi-vibrator and intermittently operates alarm buzzer 165.

According to a preferred another embodiment of the present invention, the pulse delay signal generation unit 155 and the driving control signal generation unit 160 can be implemented by the digital circuit. Also, if the pulse signal is higher than or equal to a predetermined number, the counter outputs the driving control signal and the buzzer 165 can be continuously operated.

The leakage current restriction unit 175 includes a PTC device, which is serially connected to the relay contact. Here, where the relay is operated during the overload or the generation of the short-accident, the leakage current flows. At this time, where the ground leakage breaker has broken down or is not installed therein, if the enormous leakage current continuously flows, it has the danger of fire due to the overheat. Therefore, if the leakage current flows and the temperature rises, the resistance is rapidly increased in the PTC device so that the leakage current can be rapidly reduced. According to a preferred embodiment of the present invention, it uses only one PTC device. However, it is not limited to the number thereof. In another embodiment, the plurality of the PTC devices can be used. Also, in further another embodiment, the PTC device and the NTC device can be used. In further another embodiment, the single NTC device or the plural NTC devices can be used.

The leakage current path generation unit 180 forms a path in that the leakage current flows, when the relay unit 170 is operated between the ground line G and two lines L. The leakage current path generation unit 180 according to a preferred embodiment of the present invention includes one-way direction switching devices connected between the ground line G and two lines L in the same direction. For example, in the ground line G, the diode having the forward direction can be arranged toward two lines L. Also, the diode having the forward direction can be arranged from the ground line G toward two lines L. According to the other embodiment of the present invention, if it is known that any one of two lines L is a power line H, it allows the power line H and the ground line G to be shorted, so that the leakage current flows when the relay unit 170 is operated.

In the meantime, since the circuit for detecting arc due to bad contact according to the present invention can be miniaturized by the simple circuit, it can be formed in the type of the power plug type. Also, it is built in within the multi-socket plug or the electric equipment.

Figure 2:
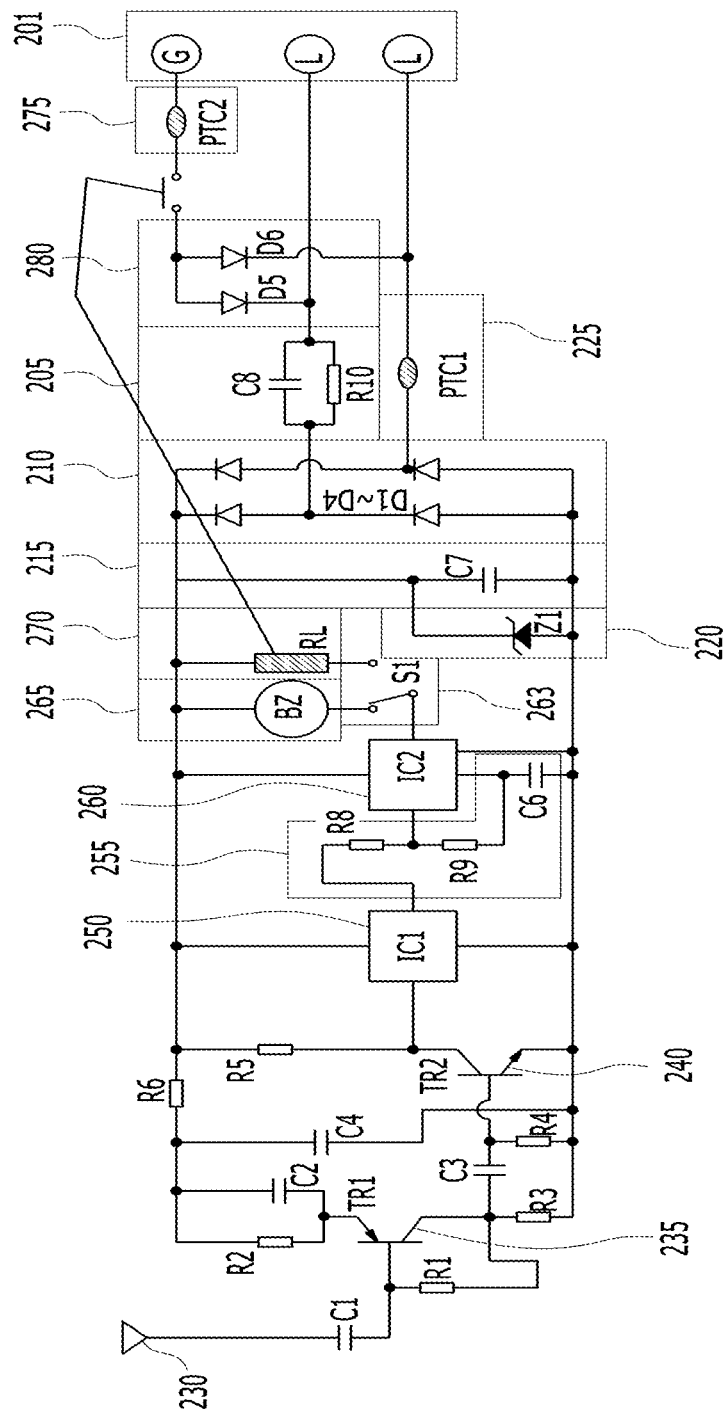
FIG. 2 is a whole circuit diagram illustrating a circuit for detecting arc due to bad contact according to a second embodiment of the present invention.

FIG. 2 is a whole circuit diagram illustrating a circuit for detecting arc due to bad contact according to a second embodiment of the present invention.

The circuit for detecting arc due to bad contact according to the second embodiment of the present invention includes the interior wire coupling unit 201, a high-frequency pass filter 205, a rectifying unit 210, a smoothing unit 215, a constant voltage unit 220, a rush current prevention unit 225, a pulse signal combining unit 230, a first signal amplification unit 235, a second signal amplification unit 240, a pulse signal generation unit 250, a pulse signal delay unit 255, a driving control signal generation unit 260, a driving control switch 263, an alarming unit 265, a relay unit 270, a leakage current restriction unit 275, and a leakage current path generation unit 280.

In the second embodiment of the present invention, where the arc pulse is generated owing to the bad contact, the alarming unit 265 is operated by using a distributed capacity arc voltage arranged between the pulse signal combining unit 230 and the ground, it sends the alarm or the relay unit 270 is operated so as to pass the leakage current, thereby driving the ground leakage breaker installed at an insertion part of the inside of the house.

Hereinafter, the configuration and operation of each unit will be explained.

In the meantime, since the configuration of the second embodiment of the present invention illustrated in FIG. 2 is mostly similar to that of the first embodiment of the present invention illustrated in FIG. 1, Different parts form FIG. 1 will be described.

The rush current prevention unit 225 includes a positive temperature coefficient device PTC1 arranged between the interior wire coupling unit 201 and the rectifying unit 210 so as to protect the arc detection circuit from the rush current or the surge applied from the power supply unit.

The pulse signal combining unit 230 is an antenna for recognizing the distributed capacity existed between the ground and the circuit as the high frequency during the arc generation due to the bad contact.

The first signal amplification unit 235 is a transistor TR1 switched on by the arc pulse of the high frequency applied through the pulse signal combining unit 230 and amplifies the arc pulse.

The second signal amplification unit 240 is a transistor TR2 switched to the arc pulse of the high frequency and secondly amplifies the arc pulse. Here, a capacitor C3 and a resistor R3 between the transistor TR1 and the transistor TR2 operates as a high pass filter HPF which is suitable to pass the high frequency signal.

The pulse signal generation unit 250 receives the arc voltage of the high frequency component which is applied through the pulse signal combining unit 230 and generates the pulse signal having the predetermined pulse width.

Figure 3:
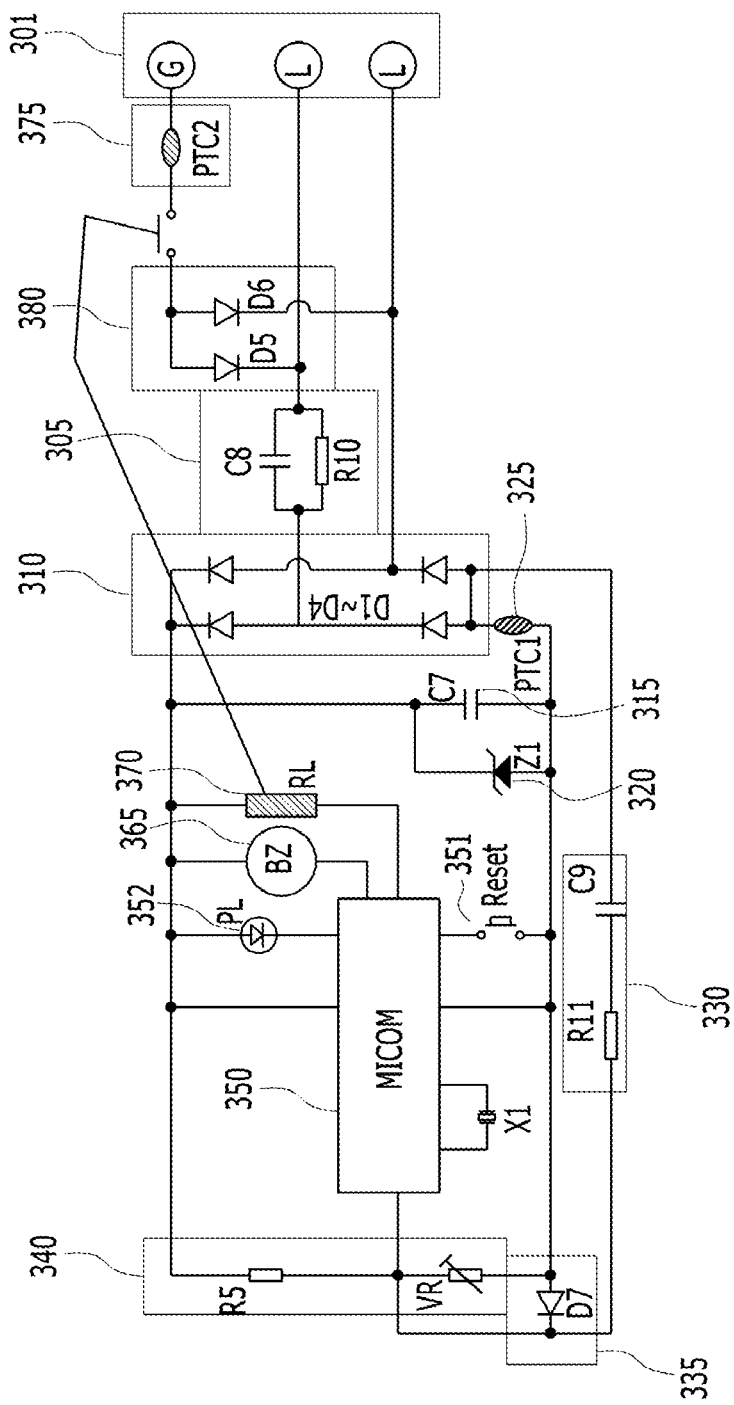
FIG. 3 is a whole circuit diagram illustrating a circuit for detecting arc due to bad contact according to a third embodiment of the present invention.

FIG. 3 is a whole circuit diagram illustrating a circuit for detecting arc due to bad contact according to a third embodiment of the present invention.

The circuit for detecting arc due to bad contact according to the third embodiment of the present invention includes an interior wire coupling unit 301, a high-frequency pass filter 305, a rectifying unit 310, a smoothing unit 315, a constant voltage unit 320, an arc voltage detection unit 325, a pulse signal combining unit 330, a unidirectional current passing unit 335, a sensitivity adjusting unit 340, a MICOM 350, a reset switch 351, a PL 352, an alarming unit 365, a relay unit 370, a leakage current restriction unit 375, and a leakage current path generation unit 380. Here, the X1 is an oscillator device for the clock generation.

In the third embodiment of the present invention, the MICOM 350 performs the functions of the mono-stable multi-vibrator of the pulse signal generation unit 150 and the non-stable multi-vibrator of the driving control signal generation unit 160 described in the first embodiment.

If the MICOM 350 receives the arc voltage of the high frequency impulsive component applied to the arc voltage detection unit 325 through the input terminal and the arc voltage is continued over the predetermined time, it allows the buzzer to be operated, so that the alarm can be continuously or intermittently sounded. If the alarm is continuously sounded over the predetermined time or reaches the fixed number, the relay can be operated. Accordingly, it can prevent the alarm from being sounded or prevent the relay from being operated owing to the temporary electrical noise.

The reset switch 351 is a configuration for removing the blocking operation recording stored in the memory of the MICOM 350.

The PL 352 can be used as a lamp for blocking operation recording display. Although the power source of MICOM is blocked, since the MICOM can memorize the operation history, it can find out the operation cause of the ground leakage breaker.

According to the circuit for detecting arc, it can detect the arc voltage during the generation of arc due to the bad contact, detect the arc current below 10 mA by detecting arc voltage, and detect the arc voltage due to bad contact using the distribution capacity to the ground, and detect the arc voltage when arc is continuously generated over a predetermined time.

While the present invention has been described with respect to the specific embodiments, it will be apparent to those skilled in the art that various changes and modifications may be made without departing from the spirit and scope of the present invention as defined in the following claims.

What is claimed is:

1. A circuit for detecting arc due to a bad contact generated between lines, which is installed in a post part of a ground leakage breaker of an interior wiring, comprising:
    a rectifying unit for rectifying an arc pulse voltage due to the bad contact;
    an arc voltage detection unit for detecting an arc voltage through the rectifying unit;
    a high-frequency pass filter combined in a front end or a rear end of the arc voltage detection unit;
    a control signal generation unit for generating a relay driving control signal using the arc voltage detected by the arc voltage detection unit; and
    a relay unit controlled by the relay driving control signal and electrically connecting a ground line and a power line of the interior wiring,
    wherein the control signal generation unit comprises:
    a pulse signal generation unit for receiving the arc voltage and generating a pulse signal having a predetermined pulse width;
    a pulse delay signal generation unit for generating a pulse delay signal, when the pulse signal outputted from the pulse signal generation unit is higher than or equal to a predetermined number; and
    a driving control signal generation unit for generating a relay driving control signal so as to operate the relay unit using the pulse delay signal.

2. The circuit for detecting arc due to a bad contact as claimed in claim 1, wherein if the control signal generation unit receives the arc voltage and the arc voltage is continued over a predetermined time, it allows a buzzer to be operated, so that an alarm can be continuously or intermittently sounded; and If the alarm is continuously sounded over a predetermined time or intermittently reaches a fixed number, it generates the relay driving control signal.

3. A circuit for detecting arc due to a bad contact generated between lines, which is installed in a post part of a ground leakage breaker of an interior wiring, comprising:
    a rectifying unit for rectifying an AC voltage between lines;
    a pulse signal combining unit for recognizing a distributed capacity existed between a ground line and the circuit as a high frequency during an arc generation due to the bad contact.
    a signal amplification unit switched on by the arc voltage of high frequency applied through the pulse signal combining unit and amplifying the arc pulse voltage;
    a high-frequency pass filter combined in a front end or a rear end of the signal amplification unit;
    a control signal generation unit for generating a relay driving control signal using the arc voltage outputted from the signal amplification unit; and
    a relay unit controlled by the relay driving control signal and electrically connecting a ground line and a power line of the interior wiring.

4. The circuit for detecting arc due to bad contact as claimed in claim 1, further comprising a buzzer controlled by an alarm control signal generated according to the pulse delay signal to be alarmed.

5. The circuit for detecting arc due to bad contact as claimed in claim 1, wherein the pulse signal generation unit is a mono-stable multi-vibrator and the driving control signal generation unit is a non-stable multi-vibrator.

6. The circuit for detecting arc due to bad contact as claimed in claim 1, further comprising one-way direction switching devices connected between a ground line and two lines in the same direction.

7. The circuit for detecting arc due to bad contact as claimed in claim 1, wherein it is electrically shorted between a power line and a ground line, thereby generating a leakage current path.

8. The circuit for detecting arc due to bad contact as claimed in claim 1, further comprising a sensitivity adjusting unit, which is connected to the input side of the pulse signal generation unit, comprises a variable resistor, so that it can control an arc pulse reference value capable of recognizing the arc voltage as an arc pulse.

\* \* \* \* \*